US010265787B2

(12) United States Patent
Lawlor et al.

(10) Patent No.: US 10,265,787 B2
(45) Date of Patent: Apr. 23, 2019

(54) LASER ALIGNMENT SYSTEM FOR SAW

(75) Inventors: Michael J. Lawlor, Chicago, IL (US);
Srinath Srinivas, Schaumburg, IL (US); Matthew D. Cox, Lake in the Hills, IL (US); Zhao Rui, Nanjing (CN); Pan Huaping, Nanjing (CN); Brian H. Chung, Schaumburg, IL (US); Wojciech T. Pierga, Barrington, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 464 days.

(21) Appl. No.: 12/769,636

(22) Filed: Apr. 28, 2010

(65) Prior Publication Data

US 2011/0265625 A1    Nov. 3, 2011

(51) Int. Cl.
| B23D 59/00 | (2006.01) |
| B23Q 3/18 | (2006.01) |
| B23Q 17/22 | (2006.01) |
| B23Q 17/24 | (2006.01) |

(52) U.S. Cl.
CPC .......... B23D 59/003 (2013.01); B23Q 3/186 (2013.01); B23Q 17/22 (2013.01); B23Q 17/2233 (2013.01); B23Q 17/2404 (2013.01); Y10T 83/828 (2015.04)

(58) Field of Classification Search
CPC .. B23D 59/03; B23D 59/0031; B23D 59/003; B23D 33/12; B23D 59/002; B23Q 17/22; B23Q 17/2233; B23Q 17/24; B23Q 17/2414; B23Q 17/2419; B23Q 17/2423; B23Q 3/186; B23Q 17/2404;
(Continued)

(56) References Cited

U.S. PATENT DOCUMENTS 2,806,492 A * 9/1957 Becker ............................ 83/520
2,911,017 A * 11/1959 Holder ................. B23Q 9/0085
83/486.1

(Continued)

FOREIGN PATENT DOCUMENTS

| CN | 2561565 Y | 7/2003 |
| CN | 2693390 Y | 4/2005 |
| CN | 1301186 C | 2/2007 |

OTHER PUBLICATIONS

State Intellectual Property Office (China), First Office Action corresponding to Chinese Patent Application No. 201110113416.0, dated May 30, 2014 (English Translation) (10 pages).

*Primary Examiner* — Clark F Dexter (74) *Attorney, Agent, or Firm* — Maginot Moore & Beck LLP (57) ABSTRACT

A power saw includes a bevel member and a cutting assembly pivotably connected to the bevel member. The cutting assembly includes a blade, a blade guard at least partially covering the blade, and at least one machined cutting assembly surface. A laser alignment device is connected to the cutting assembly. The laser alignment device includes a laser body fixed to a slideable carriage having a machined carriage surface that directly engages the machined cutting assembly surface. The slideable carriage is configured to move relative to the machined cutting assembly surface with substantially only one degree of freedom defined by an axis of translation.

9 Claims, 6 Drawing Sheets

(58) Field of Classification Search
CPC ... B25H 1/0092; Y10T 83/828; Y10T 83/839; Y10T 83/8763
USPC .......................................... 83/520, 574, 521
See application file for complete search history.

(56) References Cited

U.S. PATENT DOCUMENTS

| | | | | |
|---|---|---|---|---|
| 2,973,020 | A * | 2/1961 | Bennett | B23D 47/02 |
| | | | | 83/471.3 |
| 3,245,439 | A * | 4/1966 | Sheps et al. | 30/376 |
| 3,262,472 | A * | 7/1966 | McCarty et al. | 30/376 |
| 3,866,496 | A * | 2/1975 | Payne et al. | B23D 45/024 |
| | | | | 83/471.3 |
| 4,257,297 | A * | 3/1981 | Nidbella | 83/471.3 |
| 5,285,708 | A | 2/1994 | Bosten et al. | |
| 5,363,469 | A * | 11/1994 | Elderfield | 385/146 |
| 5,375,495 | A | 12/1994 | Bosten et al. | |
| 5,461,790 | A * | 10/1995 | Olstowski | 30/391 |
| 6,988,439 | B2 * | 1/2006 | Liu et al. | 83/520 |
| 7,066,627 | B1 * | 6/2006 | Chen | 362/259 |
| 7,387,058 | B2 * | 6/2008 | Ushiwata et al. | 362/259 |
| 7,930,962 | B2 * | 4/2011 | Ushiwata et al. | 83/520 |
| 2001/0049988 | A1 * | 12/2001 | Ushiwata et al. | 83/520 |
| 2003/0047050 | A1 * | 3/2003 | Onose et al. | 83/469 |
| 2003/0172789 | A1 * | 9/2003 | Chen | 83/522.15 |
| 2005/0126356 | A1 | 6/2005 | Garcia et al. | |
| 2005/0217448 | A1 | 10/2005 | Walker | |
| 2005/0286261 | A1 | 12/2005 | Lin | |
| 2006/0042444 | A1 * | 3/2006 | Ushiwata et al. | 83/581 |
| 2006/0101969 | A1 * | 5/2006 | Garcia et al. | 83/477.2 |
| 2006/0230894 | A1 | 10/2006 | Meredith et al. | |
| 2006/0265206 | A1 | 11/2006 | Onose et al. | |
| 2010/0242695 | A1 * | 9/2010 | Xu et al. | 83/13 |
| 2011/0283856 | A1 * | 11/2011 | Ushiwata et al. | 83/520 |

\* cited by examiner

LASER ALIGNMENT SYSTEM FOR SAW

FIELD

This application relates to the field of power tools and more particularly to power saws, such as power miter saws.

BACKGROUND

Power miter saws are often used for sawing material such as construction lumber. A miter saw typically includes a base or platform on which a turntable is positioned. The turntable is used to support a work piece thereon. A bevel member is connected to the turntable and functions to support a cutting assembly that is operable to perform a cutting operation on the work piece. The cutting assembly is pivotably connected to the bevel member such that the cutting assembly may first be moved upward and away from the turntable and then downward toward the turntable in order to produce a cut. The bevel member is pivotably connected to the turntable, thus enabling the cutting assembly to pivot in relation to the turntable in order to produce angled cuts on the workpiece.

Many miter saw arrangements include a laser alignment device that provides a visible marker showing where the blade of the cutting assembly will contact the workpiece. Laser alignment devices typically include a laser emitter having a laser body and a laser mount. The laser alignment device is often configured to provide the laser emitter with three degrees of freedom. The first degree of freedom allows the laser emitter to be moved laterally to adjust for different blade and kerf thickness. Thus, when the blade is changed by the user, the user may also change the location of the marker to indicate the cut location of the new blade.

The second and third degrees of freedom of the laser alignment device allow the parallelism of the marker to change with respect to the blade. In particular, the second degree of freedom is that the laser emitter may be tilted about a pan axis, allowing the laser marker to pan toward or away from the blade cutting location/slot while the marker remains parallel to the blade cutting location/slot. The third degree of freedom is that the laser emitter may be titled about an axis perpendicular to the pan axis such that the angle of the laser relative to the blade cutting location/slot may be adjusted. The second and third degrees of freedom are often included with the laser alignment device to allow the user to compensate for manufacturing errors in the saw and/or the laser alignment device. The second and third degrees of freedom also allow the user to adjust the laser in the event it is knocked out of alignment with the cutting location/slot during operation of the saw.

Although laser alignment devices are desirable on power saws, the mechanisms that provide for adjustment of the laser can be costly and consume valuable space on the saw. Efficient use of space is particularly important when the laser alignment device is positioned on a front portion of the upper blade guard, as the laser alignment device must typically also fit under the lower blade guard. Accordingly, it would be desirable to provide a power saw with a laser alignment device that uses relatively few parts, is relatively compact, and is relatively inexpensive to manufacture.

SUMMARY

In accordance with one embodiment of the disclosure, there is provided a power saw comprising a bevel member and a cutting assembly pivotably connected to the bevel member. The cutting assembly includes a blade, a blade guard at least partially covering the blade, and at least one machined cutting assembly surface. A laser alignment device is connected to the cutting assembly. The laser alignment device includes a laser body fixed to a slideable carriage having at least one machined carriage surface that directly engages the machined cutting assembly surface. The slideable carriage is configured to move relative to the machined cutting assembly surface with substantially only one degree of freedom defined by an axis of translation.

Pursuant to another embodiment of the disclosure, there is provided a power saw comprising a bevel member and a cutting assembly pivotably connected to the bevel member. The cutting assembly includes a blade, a blade guard at least partially covering the blade, and a machined cutting assembly surface positioned on the blade guard. A laser alignment device is connected to the blade guard. The laser alignment device includes a laser body including a ball portion. A carriage includes a socket configured to receive the ball portion of the laser body. The carriage further comprises a machined carriage surface that directly engages the machined cutting assembly surface. The carriage is configured to move relative to the machined cutting assembly along an axis of translation. A laser body lock is arranged and configured to lock the laser body in place in the socket. A carriage adjustment member is arranged and configured to move the carriage along the axis of translation.

In accordance with yet another embodiment there is provided a power saw comprising a bevel member and a cutting assembly pivotably connected to the bevel member. The cutting assembly includes a blade, a blade guard at least partially covering the blade, and a machined cutting assembly surface positioned on the blade guard. A laser alignment device is connected to the cutting assembly. The laser alignment device includes a laser body and a carriage. The carriage includes a socket and the laser body is positioned in the socket. The carriage further includes a machined carriage surface that directly engages the machined cutting assembly surface. The carriage is configured to move relative to the machined cutting assembly surface with substantially only one degree of freedom defined by an axis of translation. A laser body lock is arranged and configured to lock the laser body in place in the socket. A carriage adjustment member is arranged and configured to move the carriage along the axis of translation. A housing covers the laser alignment device on the cutting assembly. The housing provides access to the carriage adjustment member, but blocks access to the laser body lock.

The above described features and advantages, as well as others, will become more readily apparent to those of ordinary skill in the art by reference to the following detailed description and accompanying drawings. While it would be desirable to provide a power saw that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
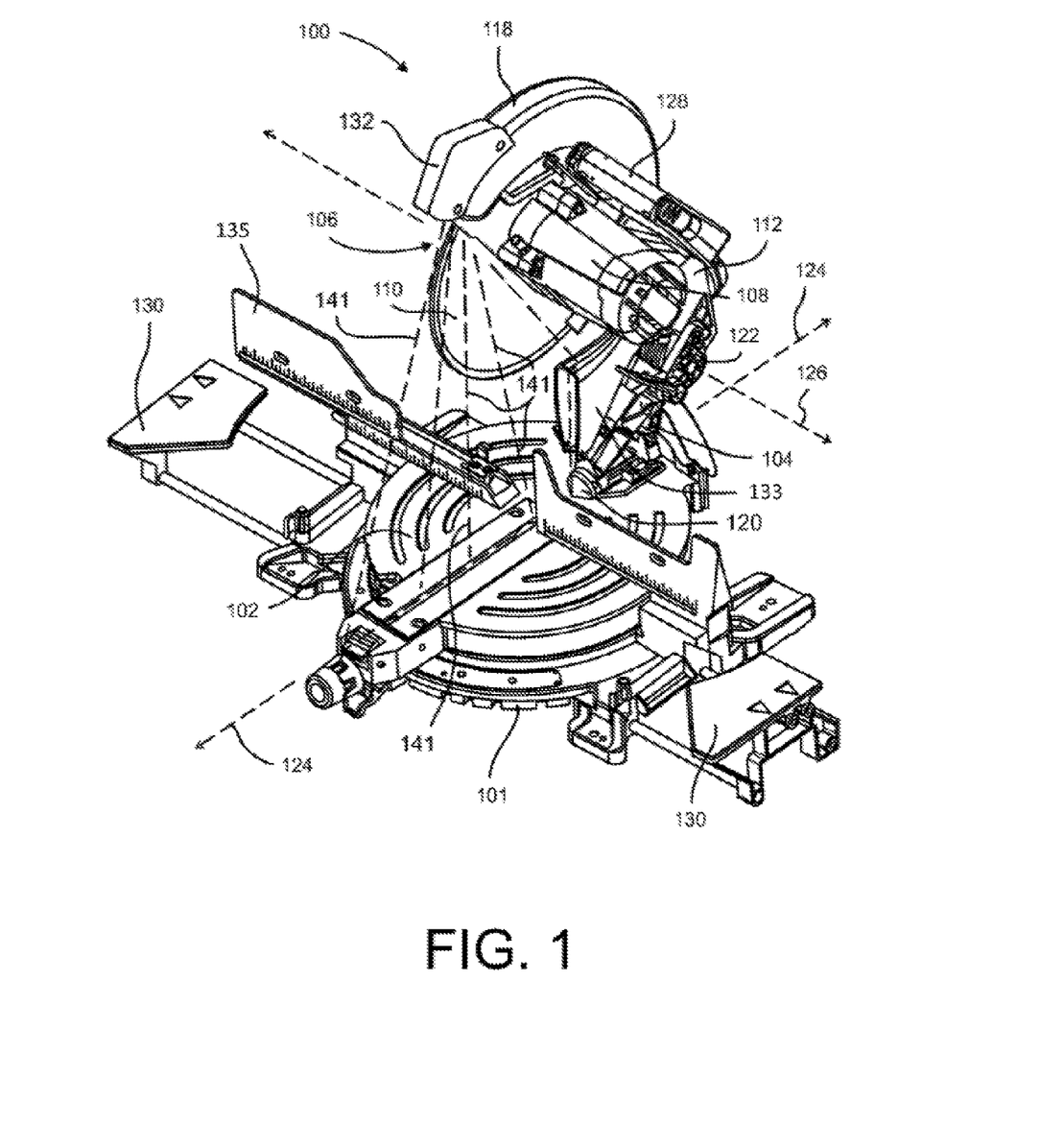
FIG. 1 shows a perspective view of a miter saw with a laser alignment system.

Referring now to FIG. 1, there is shown a miter saw assembly 100. The miter saw assembly 100 includes a base 101 and a turntable 102 that is rotatable on the base 101. The miter saw assembly 100 further includes a bevel member in the form of bevel arm 104 that is connected to the turntable 102 and configured to pivot relative to the turntable 102. A cutting head 106 is connected to the bevel arm 104 and is configured to pivot relative to the bevel arm 104. The cutting head 106 (which may also be referred to herein as a "cutting assembly") includes a group of connected components, including an arm 112, a motor 108, a blade 110, a blade guard 118, and other assembly components, as described in further detail below. The motor 108 is operable to rotate the circular saw blade 110. The bevel arm 104 operates in association with the cutting assembly 106 to allow the blade 110 to move over the turntable 102 and perform cutting operations from various angles.

The bevel arm 104 provides a bevel support structure for the cutting assembly 106. The bevel arm 104 is pivotally attached to the turntable 102 by a first pivot mechanism 120. The first pivot mechanism 120 includes a hinge arrangement that enables the bevel arm 104 to pivot with respect to the turntable 102 about bevel axis 124 during a setup procedure. In particular, the first pivot mechanism 120 enables the bevel arm 104 and the cutting assembly 106 to pivot about axis 124 from a vertical position (i.e., a 0° angle, as shown in FIG. 1) to an angle of about 45° or more prior to a cutting operation. This pivoting allows the blade 110 of the cutting assembly 106 to approach the table 102 from a bevel angle and perform angled cuts, as is well known in the art.

Figure 2:
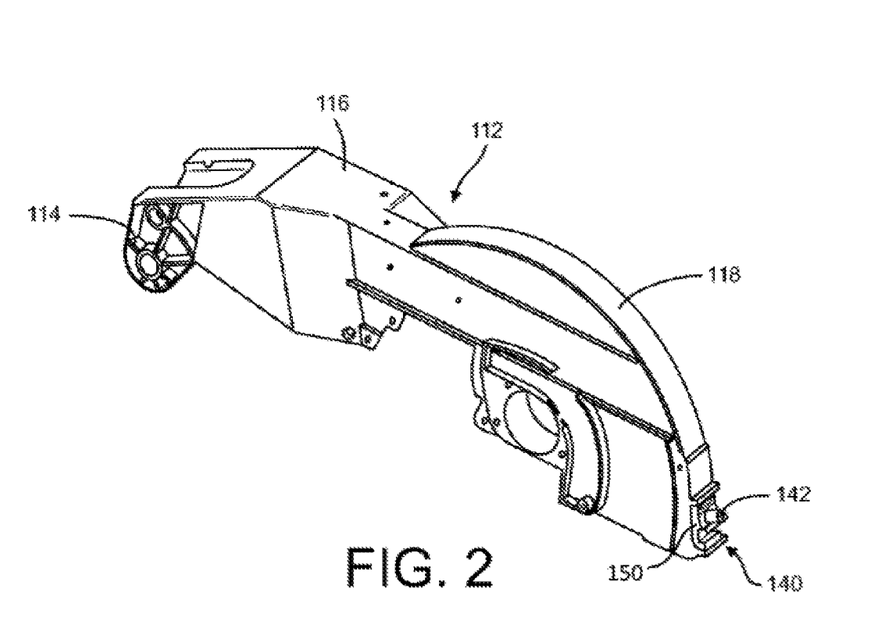
FIG. 2 shows a perspective view of a cutting arm of the miter saw of FIG. 1.

The cutting assembly 106 includes the cutting arm 112 that supports the motor 108 and blade 110 of the cutting assembly. As best seen in FIG. 2, the cutting arm 112 may be provided as a unitary part including a hinge portion 114, an extension portion 116 connected to the hinge portion 114, and the blade guard 118 connected to the extension portion 116.

Figure 3:
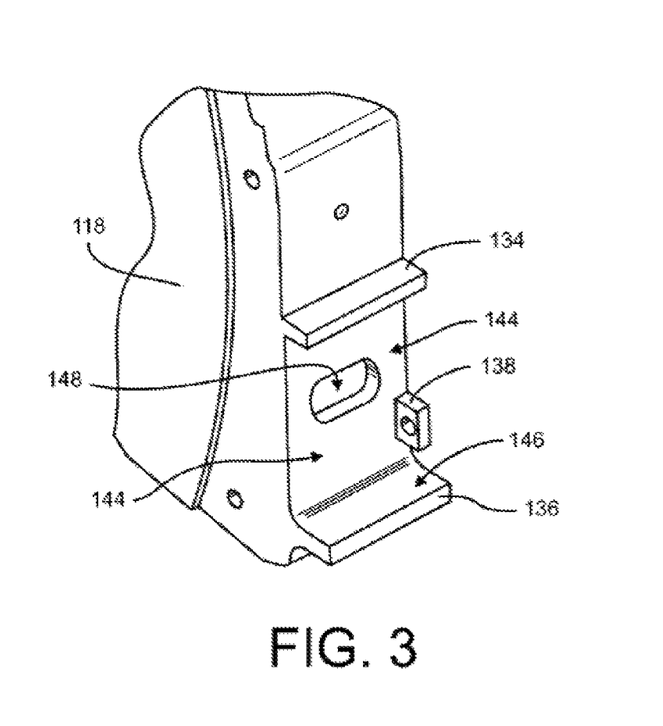
FIG. 3 shows an enlarged perspective view of the front portion of the cutting arm of FIG. 2.

As best seen in FIG. 3, the outer surface on the front of the blade guard 118 includes an upper rib 134, a lower rib 136, and a side tab 138. Each of the ribs 134, 136 and the side tab 138 extend outwardly from the primary outer surface of the blade guard 118. The surface portion 144 between the upper rib 134 and the lower rib 136 includes an opening 148 such that a laser marker positioned on the front of the blade guard 118 can be emitted through the blade guard, as explained in further detail below. The surface portion 144 is precisely machined to provide a first smooth, flat surface on the front of the blade guard 118. Similarly, the surface portion 146 facing upward on the lower rib 136 is also precisely machined to provide a second smooth, flat surface on the front of the blade guard 118. As explained in further detail below, these first and second machined surfaces 144, 146 are used in association with a laser alignment device for the miter saw 100. The word "machined" as used herein in reference refers to a surface that has been subjected to any of various machine tool finishing processes known in the art including, for example, cutting, milling, turning, grinding, shaping or planing.

With reference again to FIG. 1, the cutting arm 112 is pivotably connected to the bevel arm 104 via a second pivot mechanism 122. The pivot mechanism 122 enables the cutting assembly 106 to pivot relative to the bevel arm 104. In particular, the second pivot mechanism 122 includes a hinge that enables the cutting arm 112 to pivot with respect to the bevel arm 104 about a pivot axis 126. This pivoting allows the blade 110 of the cutting assembly 106 to move toward and away from the horizontal turntable 102 during a cutting operation, as is well known in the art.

The cutting assembly 106 also includes a handle 128 connected to the cutting arm 112. The handle 128 is configured to be grasped by a user, and allow the user to easily pivot the cutting assembly 106 in relation to the bevel arm 104 and/or the turntable 102 in order to perform a cutting operation. A switch (not shown) is provided on the handle 128 to allow the user to easily energize and de-energize the electric motor 108 during the cutting operation. The blade guard 118 covers the top portion of the circular saw blade 110 at all times during the cutting operation.

The circular saw blade 110 includes a generally circular plate having a central opening defined therein. A plurality of cutting teeth are attached to periphery of the plate, as is well known in the art. A dust chute 133 is secured to the bevel arm 104 such that the dust chute 133 pivots with the bevel arm 104 relative to the turntable 102. As shown in FIG. 1, the dust chute 133 is positioned behind the blade 110, allowing the dust chute 133 to receive sawdust and other debris sprayed from the blade 110 during a cutting operation.

The circular saw blade 110 is used to cut a work piece (not shown) positioned on a work surface provided on the base 101. The work surface includes the rotatable turntable 102 as well as laterally moveable work surface extensions 130 (which may also be referred to herein as "support extensions"). The support extensions 130 are moveable between a retracted position and the extended position shown in FIG. 1 in order to better support a work piece on the miter saw. A rip fence 135 is secured to the base 101 and positioned over the turntable 102 for aligning a work piece thereon, as is known in the art.

As mentioned previously, the miter saw assembly 100 includes a laser alignment device 140 positioned on the cutting assembly 106. In the embodiment of FIG. 1, the laser alignment device 140 is positioned behind a housing member 132 on the blade guard 118. The laser alignment device 140 comprises a metal laser body 142 that houses optics and a laser generator (not shown). In the embodiment of FIG. 1, the laser body 142 is substantially cylindrical, but it will be recognized that in other embodiments, the laser body may take on different shapes, such as the shape of the laser body in FIGS. 8-11. The laser generator may be any of various laser generators known in the art. The laser generator is typically a line generating laser configured to emit at least one narrow beam of light 141 (shown by numerous dashed lines 141 in FIG. 1) along the flat side surface of the blade 110 and toward the table 102. The beam of light 141 provides a marker which indicates where the blade 110 will cut into a workpiece positioned on the table during a cutting operation. The laser generator may include, for example, laser LEDs that emit a narrow beam of light which is directed at the table. Although laser LEDs are one embodiment of the light source providing the alignment feature, it should be understood that other light sources and arrangements can be used. For example, regular LEDs or incandescent light sources may be used in conjunction with lenses or a slotted mask. Furthermore, while the disclosed embodiment includes only a single beam of light 141 shining along one side of the blade 110, the light source may also include additional beams, such as a second beam emitted along the opposite side of the blade 110.

With reference to the embodiment of FIGS. 2-6, the laser alignment device 140 also includes a metallic carriage 150 that holds the laser body 142. The carriage 150 is mounted to the cutting assembly 106, and particularly the blade guard 118 of the saw. The carriage 150 includes two machined surfaces that slideably engage machined surfaces on the blade guard 118. In particular, the carriage includes a flat back surface 154 and a flat bottom surface 156. The flat back surface 154 of the carriage 150 directly engages machined surface 144 of the blade guard 118. Similarly, the flat bottom surface 156 of the carriage 150 directly engages machined surface 146 of the blade guard.

The metal carriage 150 includes a precision machined slot that is designed and dimensioned to retain the laser body 142 with a precise fit in the carriage. Accordingly, the metal laser body 142 directly engages the metal carriage 150 with no resilient member positioned between the metal laser body 142 and the metal carriage 150. In particular, no plastic adjustment member or other resilient carrier is positioned between the metal laser body 142 and the metal carriage 150. Instead, the machined surfaces of the laser body 142 and the metal carriage 150 provide for precise positioning of the laser body 142 in the carriage 150. Furthermore, because the metal carriage is provided as a unitary non-resilient part, the machined slot or surfaces 143 that retain the laser body 142 are unadjustably fixed relative to the machined carriage surfaces 154, 156 that engage the blade guard 118. Thus, the laser body 142 is held in place on the blade guard 118 using precision machined surfaces and without the use of resilient plastic components.

A lock is provided to fix the laser body 142 in place relative to the carriage 150. In the disclosed embodiment, the lock is provided as a screw 152 that extends through a threaded bore in the carriage leading to the laser body 142. When the screw 152 is rotated in the bore, it engages the laser body 142 and traps the laser body in place on the carriage 150. While this is one arrangement for locking the laser body 142 to the carriage 150, it will be recognized that other arrangements are also possible. For example, the laser body could be mounted with an interference fit between the laser body 142 and the carriage 150, where the laser body is press-fit into the carriage. Another example is an arrangement where the laser body is threaded and screwed into the precision hole in the carriage. In yet another arrangement, the laser body could be screwed into the carriage and a lock nut could be used to lock the laser body in place. The arrangement for locking the laser body 142 relative to the carriage 150 is generally covered by the housing member 132 which is fixed to the blade guard 118. Because the housing member 132 is fixed to the blade guard 118, the user of the saw is not provided with access to the laser locking member 152 during normal operation of the saw.

Figure 4:
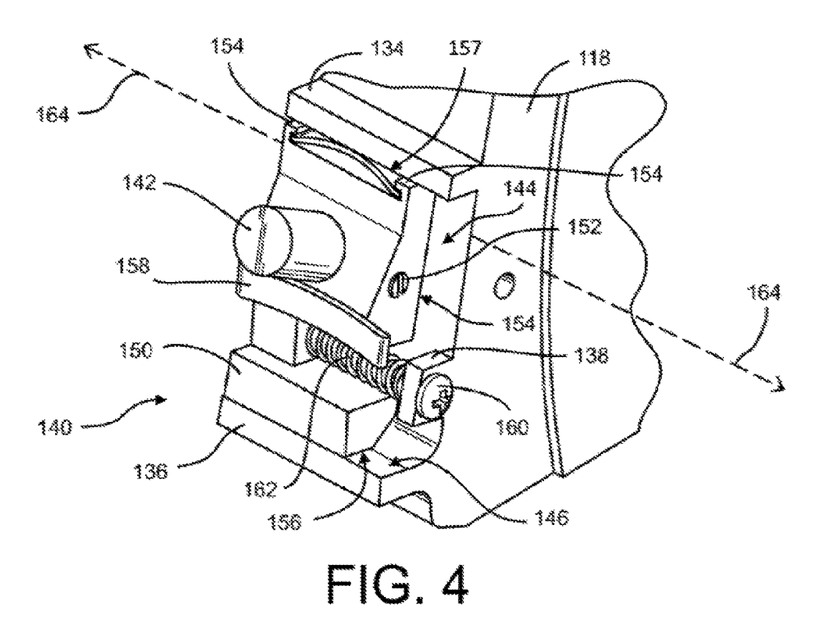
FIG. 4 shows a perspective view of a laser alignment device including a carriage holding a laser body and positioned on the front portion of the cutting arm of FIG. 3.
Figure 5:
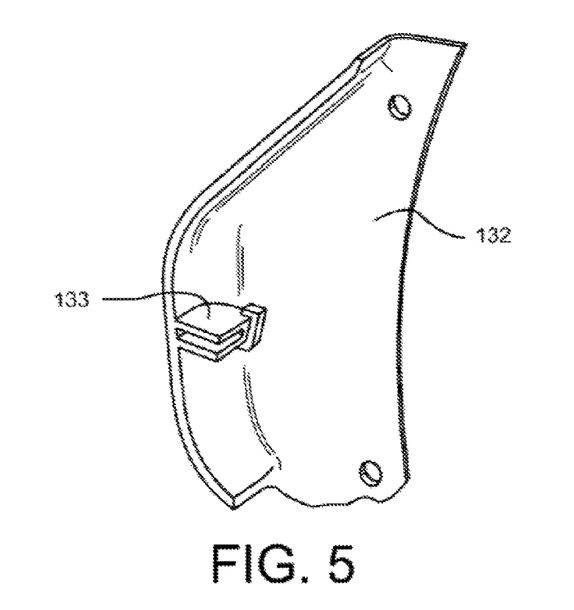
FIG. 5 shows a cutaway perspective view of a housing member configured to cover the laser alignment device of FIG. 4 on the cutting arm.
Figure 6:
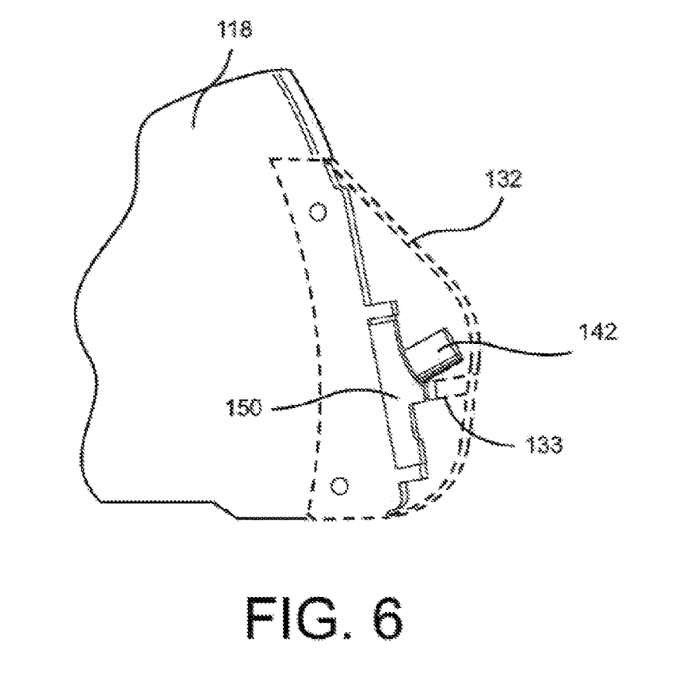
FIG. 6 shows a side view of the cutting arm with the position of the housing cover of FIG. 5 represented by dashed lines.

With particular reference now to FIG. 4, the carriage 150 also includes an upper portion with two opposing fingers 154. A first leaf spring 157 is retained on the carriage 150 between the two opposing fingers 154. When the carriage 150 is positioned between the ribs 134 and 136 on the front of the blade guard 118, the leaf spring 157 contacts the upper rib 134 and biases the carriage into engagement with the machined surface 146 on the lower rib 136. A second leaf spring 158 is retained by the housing member 132 (see FIGS. 5 and 6), and biases the carriage 150 into engagement with the machined surface 144 between the ribs 134 and 136 of the blade guard 118. The second leaf spring 158 is retained on the housing member 132 between two fingers of a mount 133 that is integrally formed on the inner surface of the housing member 132. When the housing member 132 is attached to the blade guard 118, the second leaf spring 158 presses against the front portion of the carriage 150 to urge the carriage into engagement with the machined surface 144 of the blade guard 118.

In the disclosed embodiment of FIGS. 1-6, a carriage adjustment member is provided by a screw 160 that extends through an unthreaded hole in the tab 138 of the blade guard 118. The end of the screw 160 engages another hole in the carriage 150 having complimentary threads configured to engage the threads of the screw 160. A compression coil spring 162 is retained on the screw 160 between the tab 138 and the carriage 150. The spring 162 keeps the screw head biased against the tab 138, and prevents free play in the threaded engagement between the screw 160 and the carriage 150. When the screw 160 is rotated, the threads of the screw 160 engage the threaded hole on the carriage 150 and move the carriage 150 in a lateral direction along translation axis 164. Although the laser alignment device 140 is generally covered by the housing member 132, the housing member 132 includes a hole, recess or other opening (not shown) that provides the end user with access to the screw 160 after the saw is assembled. This allows the end user to rotate the screw 160 and adjust the position of the carriage along the translation axis 164 during normal operation of the saw.

When the carriage 150 is moved along the translation axis 164, the engagement between the machined surfaces 154, 156 of the carriage 150 and the machined surfaces 144, 146 of the blade guard 118 provide for precise and smooth movement. Because the carriage 150 is constrained by the ribs 134, 136 and the leaf springs 157, 158, the carriage 150 is only allowed to move in this lateral direction 164. Furthermore, because the laser body 142 is fixed in place on the slideable carriage 150, the laser body is also only allowed to move in this lateral direction 164. As a result, both the slideable carriage 150 and the laser body 142 are afforded substantially only one degree of freedom relative to the blade guard 118. In particular, in the embodiment of FIGS. 1-6, the slideable carriage 150 and the laser body 142 are configured to move relative to the blade guard primarily only along the translation axis 164 with insubstantial (i.e., some small amount of movement related to tolerances) or no movement in other directions perpendicular to the translation axis.

Because the laser body 142 is locked in place on to the carriage 150 during manufacture of the saw 100, the saw includes a feature to block the end user from adjusting the laser body 142 on the carriage 150 following manufacture. In particular, during manufacture of the saw, the housing 132 is fixedly secured to the blade guard 118 to cover the laser alignment device 140. Therefore, following manufacture, the only laser adjustment mechanism provided to the end user is the lateral adjustment screw 160 on the side of the blade guard 118. As a consequence, the end user of the saw is only allowed to adjust the laser alignment device along the translation axis 164.

By locking rotation of the laser body 142 with respect to the carriage 150 during manufacture and preventing rotation of the carriage 150 with respect to the machined surfaces 144, 146 of the blade guard 118, the rotational element of the parallelism adjustment is eliminated from the assembly. By machining the front surface 144 of the blade guard 118, the back surface 154 of the carriage 150 and the hole for the laser body 142 in the carriage, the "pan" element of the parallelism adjustment is eliminated. Therefore, two of three possible adjustments for the laser alignment device 140 are permanently defined in the manufacturing/assembly process and the end user is only left with one adjustment for blade thickness. If adjustment of the laser body 142 with respect to the carriage 150 is ever needed, the saw must be disassembled by removing the housing 132 that is otherwise fixed to the blade guard 118.

Figure 7:
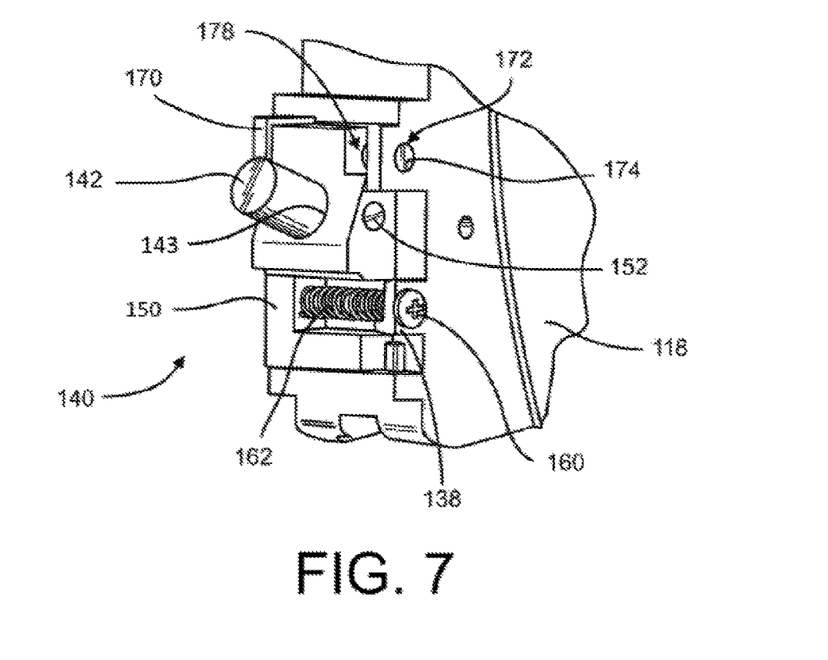
FIG. 7 shows a perspective view of an alternative embodiment of the laser alignment device of FIG. 4 where the carriage rides on a pin connected to the cutting arm.

With reference now to FIG. 7, in an alternative embodiment, the blade guard 118 includes two opposing ears 170 that extend outward on the front face of the cutting arm 112. The two ears 170 have concentric machined ear holes 172 formed therein. The cutting assembly further includes a machined cylindrical pin or rail 174 that is fixedly positioned in the ear holes 172 such that the pin 174 extends between the two ears 170. In this embodiment, the carriage 150 includes a machined hole 178 that extends completely through the upper portion of the carriage 150. The carriage hole 178 receives the pin 174 in a slideable relationship. The pin 174 acts as a rail for the carriage 150, allowing the carriage to slide along the shaft of the pin 174. Because the pin 174 and hole 178 are machined surfaces in the embodiment of FIG. 7, the carriage 150 is precisely positioned on the blade guard 118, and the surfaces 144, 146 of the blade guard and the surfaces 154 and 156 of the carriage may not be machined surfaces. Accordingly, with the embodiment shown in FIG. 7, flat machined surfaces can be eliminated on the carriage 150 and blade guard 118 and replaced with machined/drilled holes. Such holes are generally easier and less costly to produce accurately.

The blade thickness adjustment arrangement in the embodiment of FIG. 7 is generally the same as that shown for the embodiment of FIGS. 1-6 (i.e., a spring 162 and screw 160 where the screw is threaded in the carriage 150 and the screw slides through a slot in the screw tab 138). A leaf spring (not shown) is mounted to the outer housing 132 and is used to bias the carriage against the front face of the blade guard 118.

Figure 8:
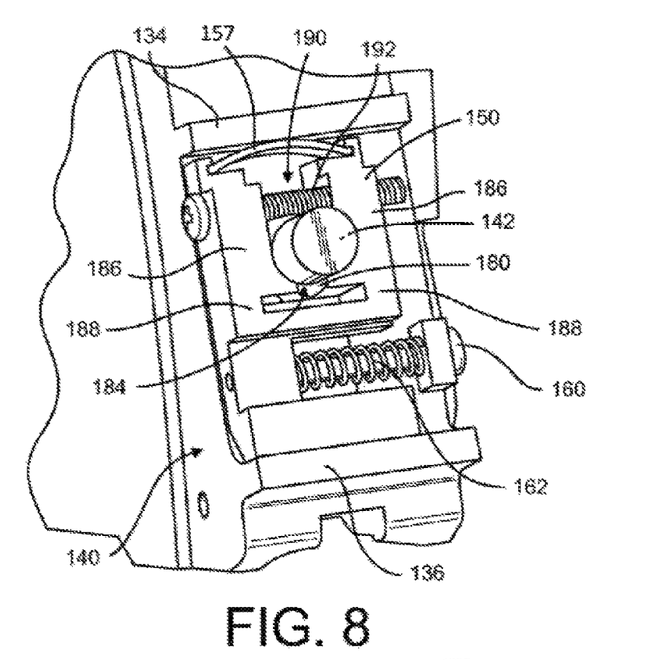
FIG. 8 shows a perspective view of another alternative embodiment of the laser alignment device of FIG. 4 where the laser body includes a ball portion.

With reference now to FIG. 8, in an alternative embodiment, the carriage 150 and cutting arm are similar to that shown in the embodiment of FIGS. 1-7, but the laser body 142 includes a ball portion 180, and the carriage includes a socket 184 to receive the ball portion 180. The ball portion 180 of the laser body 142 and the socket 184 of the carriage 150 provides a ball and socket adjustment arrangement such that the laser body can be more easily set during assembly of the saw 100. This adjustment is typically made by the manufacturer in the factory in order to set the pan adjustment of the laser emitter as well as the angle adjustment. In this embodiment, the laser body 142 is machined to include the ball portion 180, or a cylindrical laser body 142 can be positioned in a machined ball shaped sleeve.

In the embodiment of FIG. 8, the carriage is cast to include two arms 186 with relatively thin walls 188 at the base of the arms 186 that are slightly compliant. A machined slot 190 is formed between the two arms. This machined slot 190 provides a partially cylindrical slot 190 configured to receive the laser body 142 in the socket 184 at the base of the slot 190. During assembly of the laser alignment device of FIG. 8, the laser body 142 is slid in the partially cylindrical slot 190 and into the socket 184. Next, the manufacturer moves the laser body 142 within the socket 184 until the laser emitter is in a preferred angular position with the laser aligned with the blade 110 of the saw 100. In order to fixedly secure the laser body 142 in the slot 190, the two arms 186 are clamped together by a tensioner configured to draw the two arms 186 together. In the embodiment of FIG. 8, the tensioner is a screw 192 that extends between the arms 186. The screw 192 extends through a hole in one of the arms and is threaded into a hole in the opposite arm. Therefore, rotation of the screw 192 draws the two arms 186 slightly together to clamp down on the laser body 142 and fix the laser body in place on the carriage 150.

Figure 9:
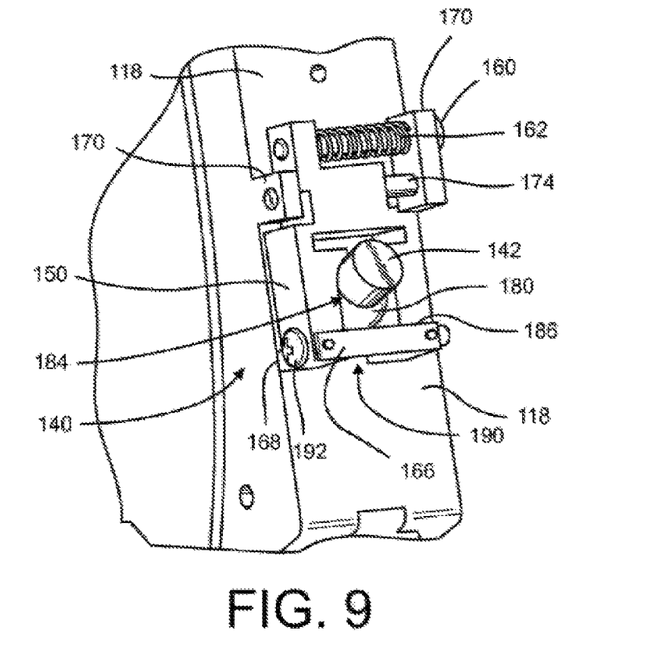
FIG. 9 shows a perspective view of another alternative embodiment of the laser alignment device of FIG. 4 wherein the carriage rides on a pin and the laser body includes a ball portion.
Figure 10:
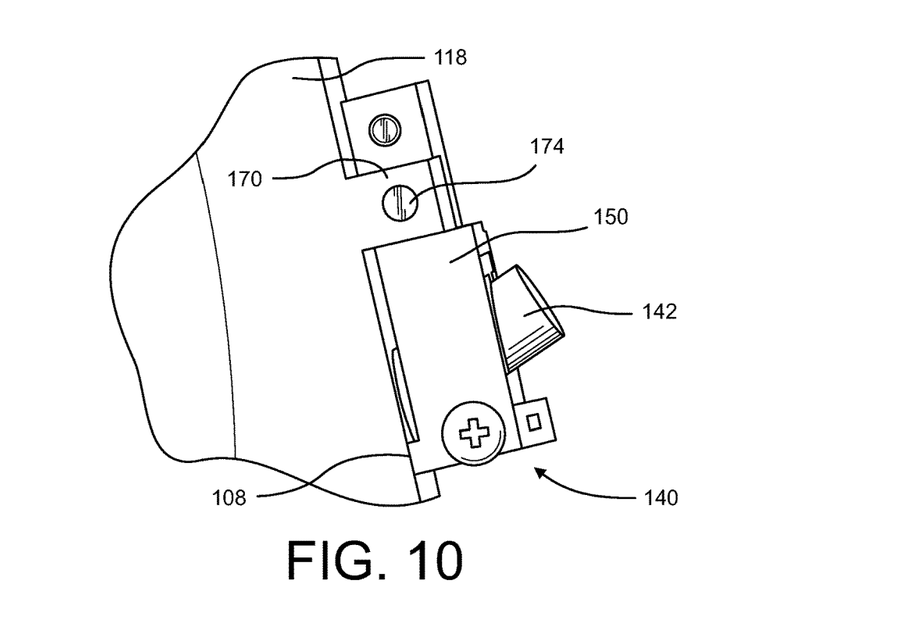
FIG. 10 shows a side view of the laser alignment device of FIG. 9.

FIGS. 9 and 10 show another alternative embodiment of the carriage 150 that is similar to the embodiment of FIG. 7, including a pin or rail 174 for the carriage to ride on, but also includes the ball and socket arrangement 180, 184 of FIG. 8. In the embodiment of FIGS. 9, and 10, a leaf spring 166 extends across the ends of the arms 186 of the carriage 150. The leaf spring 166 acts against the housing 132 to urge the carriage into engagement with the surface of the blade guard 118. To provide for smoother translation of the carriage, the lower surface of the carriage 150 may include a short rear extension 168 with a machined surface that engages another machined surface on the front of the blade guard 118.

Figure 11:
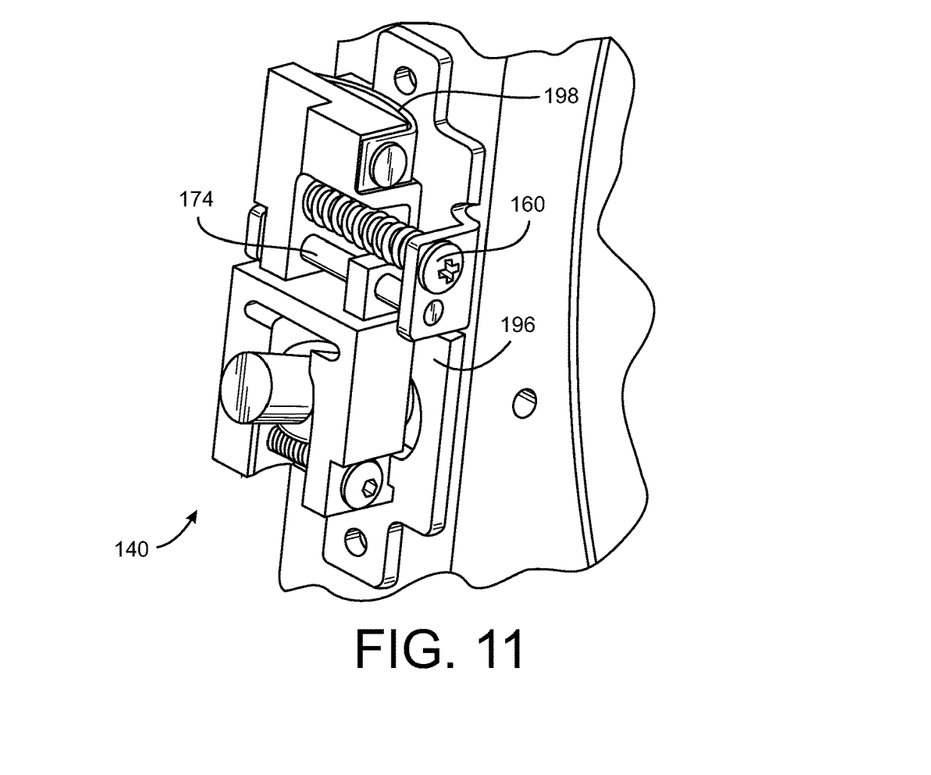
FIG. 11 shows another alternative embodiment of the laser alignment device of FIG. 4 where the carriage is positioned on a machined plate that is fixed to the cutting arm.

FIG. 11 shows yet another embodiment of the laser alignment device 140 that is similar to the embodiment of FIGS. 9 and 10, but also includes a machined bracket or plate 196 that is fixed to the front of the blade guard 118. The bracket 196 may be provided as a sheet metal piece or a casting with features configured to mount it to the cutting arm 112. The bracket 196 includes additional features used to hold a pin or rail 174 and a positioning screw 160 for the carriage. A leaf spring 198 may be provided in a reverse configuration from the above-described embodiments such that the leaf spring 198 is positioned between the bracket 196 and the carriage 150 and urges the upper end of the carriage 150 away from the bracket 196. In the embodiment of FIG. 11, the leaf spring 198 is attached to the carriage 150 with a rivet or screw. By using a metal bracket 196 between the carriage 150 and the cutting arm 112, the laser alignment device 140 is more modular and the casting and machining of the surfaces of the cutting arm 112 and carriage 150 may be is simplified relative to other embodiments. Yet another advantage to using the machined bracket 196 is that the laser alignment device 140 may be manufactured separate from the tool as a sub-assembly, and attached to the tool at any time.

Similar to the embodiment of FIGS. 1-6, it will be recognized that in each of the embodiments of FIGS. 7-11, the laser alignment device is covered by the housing 132 in order to block the end user from moving the laser body 142 relative to the carriage 150. However, the user is provided with access to the lateral adjustment mechanism 160 on the outside of the housing 132. Thus, the end user is only provided with one degree of freedom for adjustment of the laser alignment device 140.

Although the present invention has been described with respect to certain preferred embodiments, it will be appreciated by those of skill in the art that other implementations and adaptations are possible. For example, in other embodiments the laser alignment device could be adapted to include a dual laser configuration by adding a second line generator to the carriage. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A power miter saw comprising:
    a base;
    a turntable that is rotatable with respect to the base, the turntable having a workpiece support surface;
    a bevel member connected to the turntable;
    a cutting assembly pivotably connected to the bevel member, the cutting assembly including a blade having flat side surfaces and a blade guard at least partially covering the blade, the blade guard having a first machined cutting assembly surface;
    a housing member fixed to a front portion of the blade guard;
    a laser alignment device mounted onto the blade guard and covered by the housing member, the laser alignment device being configured to emit a laser beam toward the workpiece support surface to indicate a cut line of the blade, the laser alignment device including a metal laser body mounted on a slideable carriage, the slidable carriage being formed of metal and including a first machined carriage surface that directly engages the metal laser body and a second machined carriage surface that directly engages the first machined cutting assembly surface; and
    a first leaf spring positioned between the housing member and the slideable carriage so as to bias the slideable carriage into engagement with the first machined cutting assembly surface,
    wherein the slideable carriage is movable relative to the first machined cutting assembly surface with only one degree of freedom defined by an axis of translation, wherein the first machined cutting assembly surface is located on an outer surface of the front portion of the blade guard, and
    wherein the first machined cutting assembly surface and the slideable metal carriage are configured such that the axis of translation is oriented laterally with respect to the flat side surfaces of the blade.

2. The power miter saw of claim 1 wherein the first machined cutting assembly surface is a surface integrally formed on the front portion of the blade guard.

3. The power saw of claim 1 wherein the first machined cutting assembly surface is a surface provided on a plate connected to the outer surface of the blade guard.

4. The power miter saw of claim 1, wherein the blade guard includes a second machined cutting assembly surface, the second machined cutting assembly surface being substantially perpendicular to the first machined cutting assembly surface, and
    wherein the slideable carriage includes a third machined carriage surface that engages the second machined cutting assembly surface.

5. The power miter saw of claim 4 wherein the slideable carriage includes a second leaf spring that biases the slideable carriage toward the second machined cutting assembly surface.

6. The power miter saw of claim 1 further comprising a screw that engages a threaded hole in the slideable carriage, wherein rotation of the screw moves the slidable carriage along the axis of translation.

7. The power saw of claim 1 wherein the laser body includes a ball portion, and wherein the carriage includes a socket in which the ball portion is received.

8. The power miter saw of claim 1, wherein the front portion of the blade guard includes an opening that extends through the outer surface, and
    wherein the slidable carriage is positioned on the outer surface of the front portion of the blade guard such that the laser beam is emitted through the opening toward the blade.

9. The power miter saw of claim 8, wherein the laser alignment device is configured to emit the laser beam along one of the flat side surfaces of the blade such that the laser beam forms a line of light for indicating the cut line.

* * * * *